United States Patent [19]

Tanaka

[11] 3,804,974

[45] Apr. 16, 1974

[54] APPARATUS FOR RECORDING AND REPRODUCING COLOR VIDEO SIGNALS

[75] Inventor: Shigeo Tanaka, Kawasaki, Japan

[73] Assignee: Tokyo Shibaura Electric Co., Ltd., Kawasaki-shi, Japan

[22] Filed: Dec. 27, 1971

[21] Appl. No.: 212,427

[30] Foreign Application Priority Data

Dec. 28, 1970 Japan .................... 45-119795
Feb. 19, 1971 Japan .................... 46-7359

[52] U.S. Cl. .................... 178/5.4 CD, 178/6.6 TC
[51] Int. Cl. .................... H04n 9/00
[58] Field of Search .................... 178/5.4 CD, 6.6 TC; 179/100.2 E

[56] References Cited

UNITED STATES PATENTS

| | | | |
|---|---|---|---|
| 3,660,596 | 5/1972 | Numakura | 178/5.4 CD |
| 3,629,491 | 12/1971 | Dann et al. | 178/5.4 CD |
| 3,659,040 | 4/1972 | Fujita | 178/5.4 CD |

*Primary Examiner*—Robert L. Griffin
*Assistant Examiner*—George G. Stellar
*Attorney, Agent, or Firm*—Flynn & Frishauf

[57] ABSTRACT

In the apparatus for recording and reproducing color video signals, there are provided a recording section operating to convert a modulated subcarrier wave of a first frequency into another modulated subcarrier wave of a second frequency by modulating the carrier wave of the first frequency with a third fixed frequency, a reproducing section for reconverging another modulated subcarrier wave of the second frequency into the modulated subcarrier wave of the first frequency by the action of a modulator operating at the third frequency, and a compensating circuit for compensating for the variation with time of the second frequency of another modulated subcarrier wave thereby obtaining an output of the modulated subcarrier wave having a frequency substantially equal to the first frequency. The output of the third frequency and the output from the compensating circuit are selectively applied to the first mentioned modulator. By the operation of this switching means it is possible to duplicate the color video signals with two video signal recording and reproducing apparatus.

8 Claims, 1 Drawing Figure

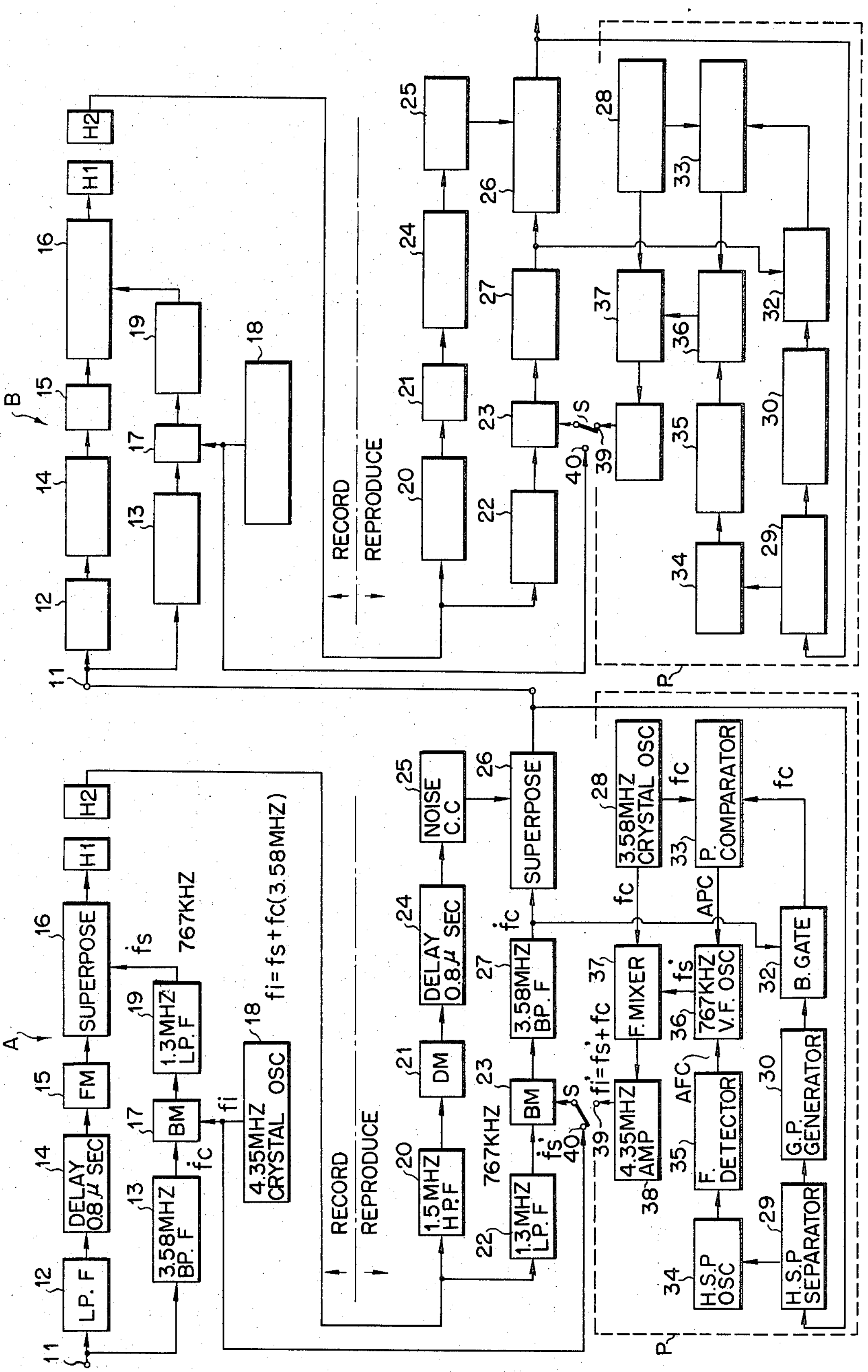
A
B
LP. F
DELAY 0.8μ SEC
FM
SUPERPOSE
H1
H2
3.58MHZ BP. F
BM
1.3MHZ LP. F
767KHZ
4.35MHZ CRYSTAL OSC
fi=fs+fc(3.58MHZ)
RECORD
REPRODUCE
1.5MHZ HP.F
DM
DELAY 0.8μ SEC
NOISE C.C
SUPERPOSE
1.3MHZ LP. F
BM
3.58MHZ BP. F
fi'=fs'+fc
3.58MHZ CRYSTAL OSC
P. COMPARATOR
F. MIXER
767KHZ V.F. OSC
APC
AFC
B. GATE
4.35MHZ AMP
F. DETECTOR
G.P. GENERATOR
H.S.P OSC
H.S.P SEPARATOR
P

APPARATUS FOR RECORDING AND REPRODUCING COLOR VIDEO SIGNALS

BACKGROUND OF THE INVENTION

This invention relates to apparatus for recording and reproducing color video signals constructed such that a color video signal recorded in a first apparatus is duplicated in a second apparatus and that the video signal recorded in the second apparatus can be readily reproduced for monitoring.

Where a color video signal is recorded on a magnetic tape and then reproduced therefrom by means of a magnetic recording and reproducing device, for example, there are provided a recording section and a reproducing section. The recording section comprises a circuit for separating the luminance signal from the colör video signal as provided by the National Television Committee System (NTSC), for example, a circuit for separating the subcarrier wave modulated by the color signal (hereinafter termed as modulated subcarrier wave) and having a first frequency (for example, about 3.58 $MH_z$) from the color video signal and then modulating the subcarrier wave by a signal of third frequency (4.35 $MH_z$, for example) to convert it into a modulated subcarrier wave having a second frequency (767 $KH_z$, for example), a circuit for superposing the frequency modulated luminance signal upon the modulated subcarrier wave of the second frequency, and means for recording the output of the superposing circuit. On the other hand, the reproducing section comprises a circuit for separating the luminance signal from the output of the recording device, a circuit for separating the modulated subcarrier wave and then modulating the separated subcarrier wave with a signal of the third frequency for reconverting it into the modulated subcarrier wave of the first frequency, and a compensating circuit for preventing the frequency of the reconverted modulated subcarrier wave from varrying with time.

There have been proposed two methods for compensating for the variation with time of the first frequency, that is the variation with time of the color signal, one involving introduction of a pilot signal into the system and the other involving the use of a burst locking oscillator. Although the first method of introducing the pilot signal can stably compensate for the variation with time of the frequency of the color signal, it is necessary to transmit and record the pilot signal. Therefore it is difficult to eliminate an inductive interference upon other circuits. In the second method of using the the burst locking oscillator it is necessary to use a quick response oscillator in the compensating circuit for the purpose of improving the response speed of the burst locking oscillator. For this reason, it is necessary to provide an automatic phase regulating circuit and an automatic frequency regulating circuit. Generally, the automatic frequency regulating circuit is constructed to detect the frequency variation of the horizontal synchronizing pulse for controlling the oscillation frequency of the oscillator included in the compensating circuit described above in accordance with the detected frequency variation. However, this automatic frequency regulation can be made only when a predetermined relation holds between the frequency of the modulated subcarrier wave, that is 3.579545 $MH_z$ (for the sake of brevity hereinafter designated as 3.58 $MH_z$) and the period of the horizontal synchronizing pulse, that is 63.556 microseconds, in other words, in terms of a frequency ratio, when the frequency of the modulated subcarrier wave is 222.5 times as large as that of the horizontal synchronizing pulse. Thus, the input signal to the recording section must satisfy this frequency ratio. If the input signal satisfies this relation, even when the frequency of the horizontal synchronizing signal is caused to vary due to the variation in the speed of the magnetic tape in a predetermined range it is possible to compensate for the frequency of the modulated subcarrier wave to 3.58 $MH_z$ so that it is possible to apply the reproduced video signal to the monitor to view the reproduced picture.

Where a video signal reproduced from a first magnetic recording and reproducing apparatus is duplicated in a second magnetic recording and reproducing apparatus and the reproduced signal in the second apparatus is monitored, an error in the regulation of the automatic frequency regulating device of the first magnetic recording and reproducing apparatus causes an important problem. Suppose now that a color video signal having the above described frequency ratio of 222.5 is recorded in the recording section of the first apparatus. If this recorded signal is reproduced by the reproducing section of the first apparatus at a tape driving speed 1 percent faster than the prescribed speed, then the frequency of the horizontal synchronizing pulse will also be increased 1 percent. Although the frequency of the modulated subcarrier wave will also be increased 1 percent, this frequency is compensated for to the prescribed value of 3.58 $MH_z$ by the action of a compensating circuit including the automatic phase regulating device and the automatic frequency regulating device. Accordingly, it is possible to monitor the reproduced video signal by the first apparatus. However, as above described, since the frequency of the horizontal synchronizing signal of the color video signal has been increased 1 percent, the above described ratio of 222.5 is not satisfied. For this reason, even when the output of the first recording and reproducing apparatus is recorded in the recording section of the second apparatus, the video signal reproduced therefrom can not be monitored. To solve this problem a method has been proposed wherein the output from the recording section of the first apparatus is recorded directly in the recording section of the second apparatus thus duplicating the video signal with its luminance signal modulated by the second frequency subcarrier wave. This method, however, decreases the S/N ratio. For this reason, it is desirable to demodulate the color video signal reproduced from the first apparatus and then duplicate it in the second apparatus.

SUMMARY OF THE INVENTION

Accordingly, it is an object of this invention to provide a novel color video signal recording and reproducing apparatus capable of readily duplicating a color video signal recorded in one recording and reproducing apparatus in another recording and reproducing apparatus by providing signal switching means in the reproducing circuit.

Another object of this invention is to provide an improved color video signal recording and reproducing apparatus including a novel compensating circuit for preventing variations with time (time base error) of the frequency of the modulated subcarrier wave in the reproducing circuit.

The color video signal recording and reproducing apparatus embodying the invention comprises a color video signal recording section including means for converting a modulated subcarrier wave of a first frequency into another modulated subcarrier wave of the second frequency which is lower than the first frequency, a color video signal reproducing section including means for reconverting the modulated subcarrier wave of the recorded video signal into the modulated subcarrier wave of the first frequency, and means for switching signals to be supplied to the reconverting means. The recording section comprises a circuit for separating a luminance signal from the color video signal, a circuit for separating the modulated subcarrier wave of the first frequency from the color video signal and for converting the separated modulated subcarrier wave into another modulated subcarrier wave of a second frequency which is lower than the first frequency by the action of a modulator operating at a third frequency, a superposing circuit for superposing each other the separated and frequency modulated luminance signal and another modulated subcarrier wave of the second frequency, and means for recording the output from the superposing circuit.

The reproducing section comprises a circuit for separating the frequency modulated luminance signal from the output from the recording means, a circuit for separating said another modulated subcarrier wave of the second frequency from the output from the recording means and reconverting this separated another modulated subcarrier wave into the modulated subcarrier wave of the first frequency by the action of the first modulator operating at a frequency substantially equal to the third frequency, a superposing circuit for superposing each other the demodulated luminance signal and the reconverted modulated subcarrier wave of the first frequency for producing a reproduced video signal, a fixed frequency oscillator for supplying said third frequency to the first modulator, and a compensating circuit connected to receive the reconverted modulated subcarrier wave of the first frequency for producing an output having a frequency substantially equal to the third frequency for the purpose of compensating for the variation with time of the first frequency.

The purpose of the switching means is to selectively supply the output of the fixed frequency oscillator operating at the third frequency and the output of the compensating circuit to the first modulator.

According to this invention it is possible to maintain the ratio between the frequency of the modulated subcarrier wave in the output of the first reproducing apparatus and the frequency of the horizontal synchronizing frequency as that of the recorded signal by reconverting the subcarrier wave of second frequency into the subcarrier wave of first frequency by supplying the fixed third frequency to the first modulator of the reproducing section under control of the signal switching means. A signal reproduced from the first apparatus is recorded in the recording section of the second apparatus. When reproducing the video signal by the second apparatus, the switching means is switched to the output terminal of the compensating circuit of the second apparatus. Then the first modulator of the reproducing section is operated by the output frequency of the compensating circuit of the second apparatus. Therefore the output of the first modulator of the second apparatus will be the modulated subcarrier wave of the first frequency. For this reason, it becomes possible to monitor the video signal reproduced from the second apparatus.

The compensating circuit may be any one of various types. However, it is advantageous to include in the compensating circuit a closed loop automatic phase regulating device which compares the phase of the first frequency generated by a stable oscillator such as a crystal oscillator and the phase of the burst signal to generate an output which is utilized to control the oscillation frequency of the oscillator operating at the second frequency. By this means, it is possible to compensate at a high degree the variation with time of the first frequency of the reconverted modulated carrier wave.

The term "modulated carrier wave" used herein means a carrier wave whose amplitude and/or phase are modulated by the color signal.

BRIEF DESCRIPTION OF THE DRAWING

In the accompanying drawing, the single FIGURE shows a block connection diagram wherein two sets of the color video signal recording and reproducing apparatus embodying the invention are used to duplicate the video signal from the first apparatus to the second apparatus.

DESCRIPTION OF THE PREFERRED EMBODIMENT

In the drawing, A and B show two independent color video signal recording and reproducing apparatus or units constructed according to the teaching of the invention which are interconnected such that video signals are reproduced from device A, duplicated in unit B and the video signals reproduced from unit B are monitored. Since both units have the same construction, corresponding component parts are designated by the same reference numerals and only the unit A is described in detail. In the drawing, symbol *f* represents a modulated frequency, *f'* a frequency that varies with time and f a frequency that does not vary with time. A color video signal is applied to the input terminal 11 of a recording section of unit A. It is assumed herein that this input signal is a signal provided by the NTSC and that the ratio between the frequency of the horizontal synchronizing signal and that of the modulated subcarrier wave is 1 : 222.5.

In the recording section the input video signal is separated into a luminance signal and a modulated subcarrier wave of 3.58 $MH_z$, respectively, by the actions of a low pass filter 12 and a band pass filter 13 having a pass band of 3.58 $MH_z$. The luminance signal is delayed by a delay circuit 14 by 0.8 microseconds, for instance, and the delayed signal is frequency modulated by an FM modulator 15 and is then applied to a frequency superposing circuit 16. The modulated subcarrier wave having a frequency of 3.55 $MH_2$ (first frequency *fc*) produced by band pass filter 13 is subjected to a balanced modulation in a balanced modulator 17 by an idler frequency fi (third frequency) generated by a crystal oscillator 18 operating at a frequency of 4.35 $MH_z$. The output from the balanced modulator is applied to a low pass filter 19 having a pass band of 1.3 $MH_z$ and the modulated subcarrier wave having a frequency of 767 $KH_z$ (second frequency *fs*) passed through the low pass filter 19 is applied to another input of the superposing circuit 16 which functions to superpose the modulated luminance signal upon the modulated subcarrier wave which has been converted into a low frequency. The output from the superposing circuit 16 is recorded on a video tape, not shown, through a magnetic head HI.

The video signal reproduced by a reproducing magnetic head H2 is separated into a luminance signal and a modulated subcarrier wave respectively by the action of a high pass filter 20 operating at a frequency of 1.5 $MH_z$ and a low pass filter 22 operating at a frequency of 1.3 $MH_z$ which are included in the reproducing section. The luminance signal from high pass filter 20 is demodulated by a demodulator 21 and is then delayed 0.8 microsecond by a delay circuit 24. After passing through a noise cancelling circuit 25, the delayed signal is applied to one input of a superposing circuit 26. The modulated subcarrier wave having a low frequency of 767 $KH_z$ (second frequency) passed through low pass filter 22 is applied to a balanced modulator 23 where it is reconverted into a subcarrier wave of a frequency of 3.58 $MH_z$ by the action of an idler frequency to be described later. After passing through a band pass filter 27 operating at a frequency of 3.58 $MH_z$, the output from balanced modulator 23 is applied to superposing circuit 26 in which the luminance signal and the reconverted modulated subcarrier wave are superposed to produce a reproduced color video signal.

In order to monitor the reproduced video signal, the frequency of the modulated subcarrier wave contained in the video signal should be equal to 3.58 $MH_z$. However, in an ordinary video tape recorder (VTR) the speed of the tape varies not only in the recording section but also in the reproducing section. Accordingly, the frequencies of both horizontal synchronizing signal and modulated subcarrier wave vary. For this reason, in order to monitor the reproduced video signal, it is necessary to compensate for the variation with time of the frequency of the modulated subcarrier wave so as to supply a modulated subcarrier wave having a frequency of approximately 3.58 $MH_z$ to the superposing circuit 26. To this end, a circuit for compensating for the variation with time of the frequency of the modulated subcarrier wave is used. In this embodiment, a novel compensating circuit generally designated by a reference character P is provided for the reproducing section, the details thereof being not material to this invention.

The compensating circuit P illustrated in the drawing comprises an oscillator 28 which produces a stable frequency which is substantially equal to the first frequency fc (3.54 $MH_z$), for example, a crystal oscillator, a circuit 29 for separating the horizontal synchronizing signal from the reproduced video signal from superposing circuit 26, a shaping circuit 30 for the horizontal synchronizing signal, a burst gate 32 connected to receive the reconverted subcarrier wave *fc* of the first frequency and the output from the shaping circuit 30 to derive a burst signal out of the subcarrier wave, and a phase comparator 33 to compare the phases of the output fc from crystal oscillator 28 and of the burst signal for producing a phase regulating signal APC. Further, there are provided a synchronous signal producing oscillator connected to receive the separated horizontal synchronizing pulse for generating a signal having the same frequency as the horizontal synchronizing pulse, a frequency detector 35 responsive to the instantaneous shift of the oscillation frequency at each moment of the oscillator 34 from the mean value of the pulse frequency for producing an automatic frequency regulating signal AFC, and a variable frequency oscillator 36 controlled by the phase regulating signal APC and the frequency regulating signal AFC for stably producing the second frequency *f*s of 767 $KH_z$. The output having the first frequency fc from crystal oscillator 28 and the output having the second frequency *f*s from oscillator 36 are mixed together in a mixer 37 for producing an idler frequency *f*i having a frequency substantially equal to the third frequency. The idler frequency output is amplified by an amplifier 38 operating at a frequency of 4.35 $MH_z$ to provide an amplified output at a terminal 39. The output from crystal oscillator 18 is supplied to a terminal 40.

To perform the duplication of the reproduced video signal in device A to device B in a manner to be described later, in accordance with this invention, there is provided a signal transfer switch S to supply to the balanced modulator 23 an idler frequency signal either from terminal 39 or terminal 40.

Since in the illustrated compensating circuit, the phase regulating circuit is constructed as a closed loop the error due to the variation with time of the frequency contained in the reconverted modulated subcarrier wave *fc* amounts to one divided by the loop gain. Accordingly it is possible to greatly decrease the error by increasing the loop gain. Further, since the idler frequency *f*i is equal to the sum of the output frequency *f*s of oscillator 36 and the output frequency *fs* of the stable oscillator 28 and the drawing frequency of the loop using burst signal is theoretically ± 7.8 $KH_z$, it is possible to permit the frequency of the oscillator 36 to drift at a large ratio. When compared with an oscillator operating at a frequency of 4.35 $MH_z$, the drift of the oscillator 36 caused by temperature variation or aging can be allowed to be 5 times larger. Moreover, the construction of the novel compensating circuit is simple.

Where the variation with time of the frequency of the modulated subcarrier wave is large as in a magnetic recording and reproducing apparatus, means is provided for generating automatic frequency regulating signal FAC, and by controlling oscillator 36 by the combined action of this signal AFC and the automatic frequency regulating signal APC, it is possible to produce an idler frequency *f*i that can reduce the frequency drift and to provide a compensation that maintains the frequency *fc* of the reconverted modulated subcarrier wave.

To duplicate a video signal reproduced from apparatus A in apparatus B the signal transfer switch S of apparatus A is thrown to terminal 40 to perform reproduction. Under these conditions since the idler frequency *fi* applied to modulator 23 is not compensated for, should the frequency of the horizontal synchronizing pulse of the reproduced video signal drift 1 percent, the frequency of the modulated subcarrier wave would also drift 1 percent, thus preserving the ratio 1 : 222.5 described above. The video signal with such a frequency ratio is supplied to input terminal 11 of apparatus B to be recorded in the recording section thereof. To reproduce this signal from apparatus B, transfer switch S is thrown to terminal 39. So long as the variation in the frequency of the modulated subcarrier wave is within a prescribed range, the compensating circuit P of apparatus B produces an idler signal having a frequency *f*i of 4.35 $MH_z$ which is supplied to modulator 23 to obtain a modulated subcarrier wave reconverted to a frequency of 3.58 $MH_z$. As a result, the superposing circuit 26 of apparatus B produces a monitorable or color synchronized video signal.

What we claim is:

1. A color video signal recording and reproducing apparatus comprising:

a recording section comprising a circuit including means for separating a luminance signal from a color video signal and means including a first modulator for frequency modulating the separated luminance signal, a circuit including means for separating a modulated subcarrier wave of a first frequency from said color video signal and means including a second modulator for frequency converting said separated modulated subcarrier wave into another modulated subcarrier wave having a second frequency which is lower than said first frequency by the action of said second modulator operating at a third frequency, a superposing circuit for superposing on each other said separated and modulated luminance signal and said another modulated subcarrier wave of said second frequency, and recording means for recording the output from said superposing circuit;

a circuit including means for separating said luminance signal from the output from said recording means;

a circuit including means for separating said another modulated subcarrier wave of said second frequency from the output from said recording means and means including a third modulator for reconverting said separated another modulated subcarrier wave into said modulated subcarrier wave of said first frequency by the action of said third modulator operating at a frequency which is substantially equal to said third frequency;

a second superposing circuit to superpose on each other said separated luminance signal from said recording means and said reconverted modulated subcarrier wave of said first frequency for producing a reproduced video signal;

an oscillator operating at said third frequency for supplying a signal having said third frequency to said second modulator;

a compensating circuit connected to receive said reconverted modulated subcarrier wave of said first frequency for producing an output having a frequency substantially equal to said third frequency for compensating for the variation with time of said first frequency of said modulated subcarrier wave; and switching means coupled to said oscillator operating at said third frequency and to said compensating circuit for selectively supplying to said third modulator the output from one of said oscillator operating at said third frequency and said compensating circuit.

2. Apparatus according to claim 1 wherein said compensating circuit comprises an oscillator producing a fixed signal having a frequency which is substantially equal to said first frequency, a burst gate circuit for separating a burst signal from said reconverted modulated subcarrier wave of said first frequency, a phase comparator for comparing the phase of the output from said burst gate circuit with the phase of the output from said fixed frequency oscillator for producing a phase regulating signal, a variable frequency oscillator controlled its frequency by said phase regulating signal for producing an output having a frequency substantially equal to said second frequency, and a mixer for admixing the output from said fixed frequency oscillator and the output from said variable frequency oscillator for producing an output having a compensated frequency substantially equal to said third frequency.

3. Apparatus according to claim 2 wherein said oscillator for supplying an output of the third frequency to said first modulator and said fixed frequency oscillator operating at said fixed frequency respectively comprise crystal oscillators.

4. Apparatus according to claim 1 wherein said compensating circuit comprises a fixed frequency oscillator producing an output having a fixed frequency substantially equal to said first frequency, a circuit for separating a horizontal synchronizing signal from the output from said second superposing circuit, a frequency detector responsive to the frequency of the horizontal synchronizing signal for producing a frequency regulating signal corresponding to the difference between the detected frequency of said horizontal synchronizing signal and the mean frequency thereof for producing a frequency regulating signal, a burst gate circuit connected to receive said reconverted modulated subcarrier wave of said first frequency and said horizontal synchronizing signal for separating a burst signal from said reconverted modulated subcarrier wave, a phase comparator for comparing the phase of the output from said burst gate circuit with the phase of the output from said fixed frequency oscillator to produce phase regulating signal, a variable frequency oscillator controlled its oscillation frequency by said phase regulating signal and said frequency regulating signal for producing an output having a frequency substantially equal to said second frequency, and a mixer for admixing the output from said fixed frequency oscillator operating at said fixed frequency and the output from said variable frequency oscillator operating at said frequency for producing an output of a compensated frequency substantially equal to said third frequency.

5. Apparatus according to claim 3 wherein said oscillator for supplying an output of the third fixed frequency to said first modulator and said fixed frequency oscillator operating at said fixed frequency respectively comprise crystal oscillators.

6. Apparatus according to claim 1 wherein said second modulator is a balanced modulator.

7. Apparatus according to claim 1 wherein said third modulator is a balanced modulator.

8. Apparatus according to claim 1 wherein said means for separating said luminance signal from the output of said recording means includes means for removing the modulated luminance signal from the output from said recording means for demodulating the removed modulated luminance signal, to thereby produce said luminance signal from the output of said recording means.

* * * * *

UNITED STATES PATENT OFFICE
CERTIFICATE OF CORRECTION

Patent No. 3,804,974 Dated April 16, 1974

Inventor(s) Shigeo TANAKA

It is certified that error appears in the above-identified patent and that said Letters Patent are hereby corrected as shown below:

Column 7, line 61, delete "fixed signal having a"

insert --signal having a fixed--;

Column 8, line 44, after "operating at said" insert

--second--.

Signed and sealed this 10th day of September 1974.

(SEAL)
Attest:

McCOY M. GIBSON, JR.
Attesting Officer

C. MARSHALL DANN
Commissioner of Patents